UNITED STATES PATENT OFFICE.

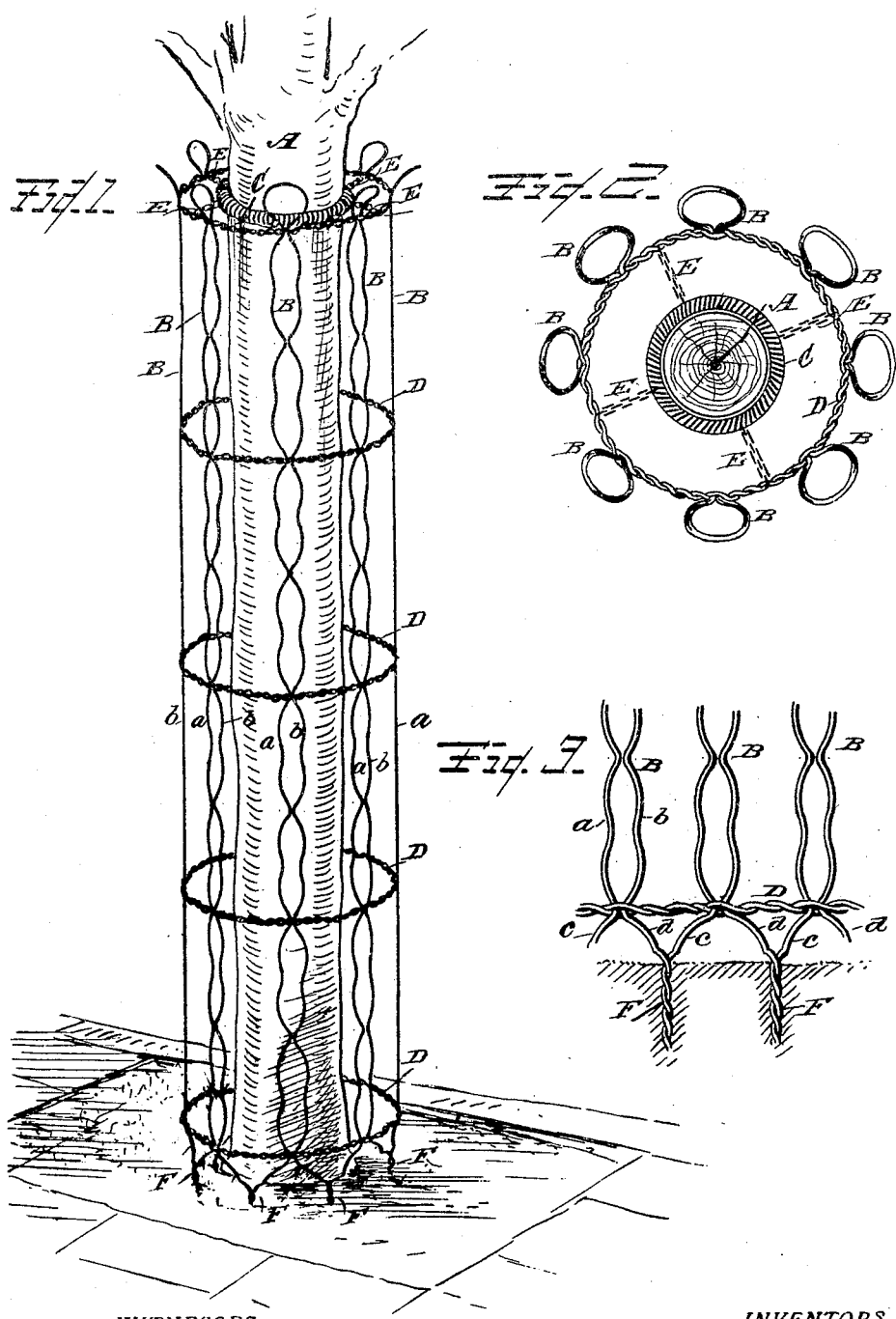

CHARLES ALFRED HOLT, OF MEDFORD, AND CHARLES FRANK PEACOCK, OF EVERETT, MASSACHUSETTS.

TREE-PROTECTOR.

No. 799,466. Specification of Letters Patent. Patented Sept. 12, 1905.

Application filed June 28, 1905. Serial No. 267,414.

*To all whom it may concern:*

Be it known that we, CHARLES ALFRED HOLT, residing at Medford, and CHARLES FRANK PEACOCK, residing at Everett, in the county of Middlesex and State of Massachusetts, citizens of the United States, have invented certain new and useful Improvements in Tree-Protectors; and we do hereby declare that the following is a full, clear, and exact description of the same, reference being had to the annexed drawings, making a part of this specification, and to the letters of reference marked thereon.

The present invention has reference to that class of tree-protectors constructed of wire pickets held together a suitable distance apart around the trunk or body of the tree by twisted-wire cables; and the object thereof is to provide such a device that will possess strength and durability, the lower ends of the pickets terminating in twisted-wire anchors to enter the ground to form a rigid support for the device and securely hold it in an upright position.

The invention consists in a tree-protector constructed substantially as shown in the drawings and hereinafter described and claimed.

Figure 1 of the drawings is a perspective view of a tree-protector constructed in accordance with our invention and showing it placed around the body or trunk of a tree. Fig. 2 is a plan view of the upper end of the protector, showing the body or trunk of the tree in horizontal section. Fig. 3 is a detail view, on an enlarged scale, showing the twisted-wire anchors entering the ground.

In the accompanying drawings, A represents the body or trunk of a tree to illustrate the application of our invention thereto, the protector consisting of a plurality of wire pickets B, a wire or rod of sufficient length being bent double and in any suitable shape or design to form vertical and downwardly-extending arms *a b*.

The pickets B, as above described, are held at suitable distances apart by encircling cables D of twisted wire, said cables being formed by two strands of wire twisted together and the pickets held in position by weaving the same between the strands of wire of the cable during the process of twisting.

The pickets are preferably constructed of heavy galvanized wire crimped or otherwise formed into any desired design and bent double, so that the leg *c* of one picket will be opposite to the leg *d* of the adjoining picket.

The series of pickets and twisted-wire cables form together a fabric which after being bent around the trunk or body of the tree and the extremities of the twisted cables joined securely together provides a thoroughly practical and also ornamental tree-protector, which being quite flexible readily adapts itself to the movement of the tree, thus preventing injury thereto. In order to hold the protector or guard thus formed in a concentric relation to the tree, a simple device is provided, which not only holds the protector securely in position, but also allows for the growth of the tree. This device consists of a coiled spring C, loosely encircled around the trunk or body of the tree and its ends suitably joined, thereby forming a circular band or ring around the same, but not necessarily in contact therewith. The circular coiled spring C is held in position by a plurality of chains or other like flexible connection, shown at E, which connections are attached to the spring and to the twisted-wire cables and form radial and flexible supports to the spring and allow the proper expansion thereof to adapt it to the growth of the tree.

The leg *c* of each of the pickets B joins with the leg *d* of the opposite picket, and the two legs are twisted together to form a strong and rigid anchor F to penetrate the ground, as shown in Fig. 3 of the drawings, to hold the protector in a firm and upright position. The anchors F being formed of the wire legs of separate pickets twisted together, forms a more perfect and rigid support for the pickets, and the twist in the anchors will more securely hold them in the ground, and the manner of connecting each individual picket one with the other by the twisted-wire anchors prevents the individual pickets from twisting in the cables into which they are woven, also adds strength and rigidity to the protector.

It is evident that many changes and modifications in the details of construction may be resorted to without in any manner departing from the essential features of the invention.

Having now fully described our invention, what we claim as new, and desire to secure by Letters Patent, is—

1. A tree-protector comprising wire pickets, each picket having two downwardly-extending arms which terminate in legs, the leg of one picket joining the leg of the adjacent picket and twisted together to form twisted-wire anchors, and suitable cables extending around the pickets and engaging the same, substantially as and for the purpose set forth.

2. A tree-protector comprising wire pickets, each picket having two downwardly-extending arms terminating in legs, the leg of one picket joining the leg of the adjacent picket and the two twisted together to form anchors, suitable cables engaging the pickets, a coiled spring adapted to extend around the trunk or body of the tree and held in position by flexible connection extending radially from the spring to the cable and attached thereto, substantially as and for the purpose described.

In testimony whereof we affix our signatures in presence of two witnesses.

CHARLES ALFRED HOLT.
CHARLES FRANK PEACOCK.

Witnesses:
ROBERT TOWERS,
LEWIS W. WARREN.